Dec. 11, 1956     L. B. YOUNG     2,774,034

FREQUENCY COMPARATOR

Filed Dec. 11, 1945

INVENTOR
LOUIS B. YOUNG

BY     ATTORNEY

United States Patent Office 2,774,034
Patented Dec. 11, 1956

2,774,034

FREQUENCY COMPARATOR

Louis B. Young, Cambridge, Mass., assignor, by mesne assignments, to the United States of America as represented by the Secretary of the Navy Application December 11, 1945, Serial No. 634,293

8 Claims. (Cl. 324—58)

This invention relates to microwave frequency comparators, more particularly those for calibrating resonant circuits against other circuits of known resonant frequency.

In the production of microwave resonant devices such as cavities, wavemeters, echo boxes, etc., it is desirable to calibrate the finished product against a reference cavity, wavemeter, or echo box, the calibration of which has been checked against a primary frequency standard.

It is an object of the present invention to provide a circuit which can be used to compare the resonant frequencies of two circuits.

It is another object to provide a circuit for testing the calibration of a tunable resonant circuit at one or more points.

Figure 1:
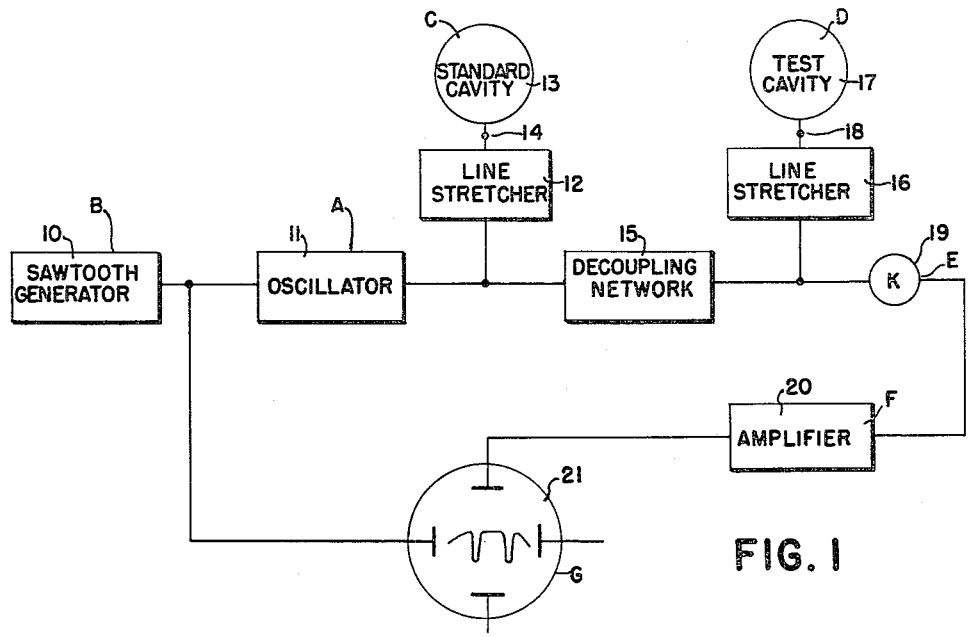
Figure 2:
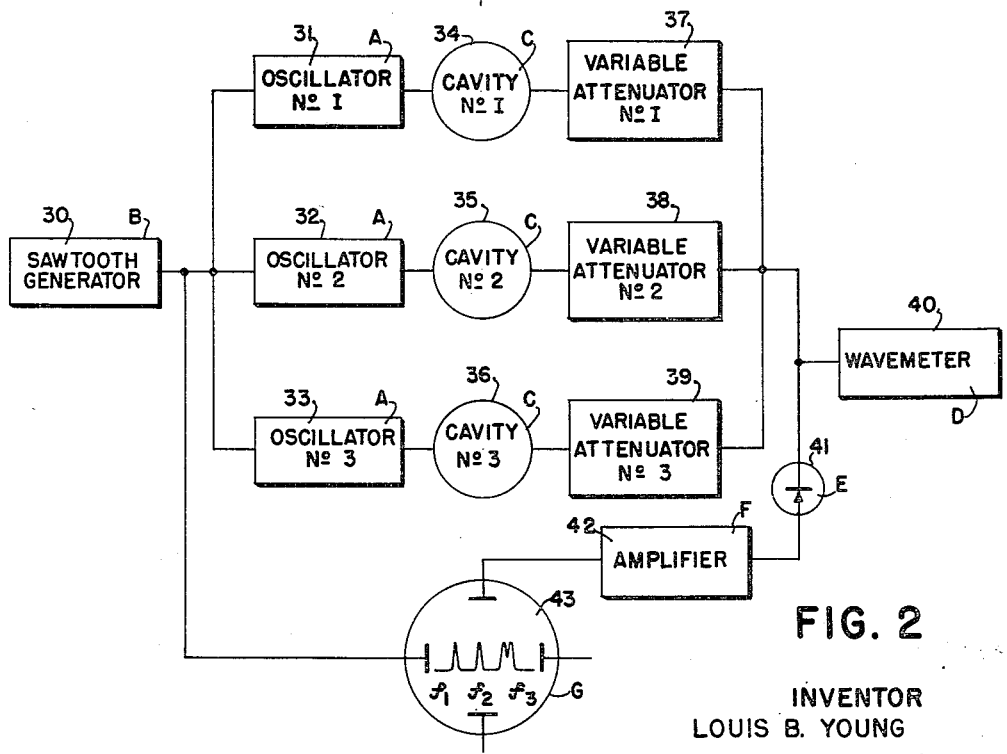

These and other objects will be more apparent upon consideration of the following specifications, taken in connection with the accompanying drawings forming a part thereof, in which:

Fig. 1 is a block diagram of an embodiment of the invention for comparing the resonant frequencies of two cavities; and Fig. 2 is a block diagram of an embodiment of the invention for testing the calibration of a wavemeter at three points.

Referring to both forms of the invention as shown in Figs. 1 and 2, the invention comprises generically, a means A for generating oscillations, a means B for varying the frequency of said oscillations, a circuit C resonant at a known frequency, and a circuit D resonant at an unknown frequency. Both circuits C and D are excited by the oscillator A, and the response of these circuits is detected at E and indicated by G. A desirable form of indicator is a cathode ray tube, as shown. If needed, an amplifier F may be employed. The indicator shows any difference in the resonant frequency of said circuits.

Referring more particularly to Fig. 1, the output of sawtooth generator 10 is applied to oscillator 11 in such a manner that it frequency modulates said oscillator. In the particular embodiment herein described a reflex velocity-modulated tube is used, the sawtooth voltage being applied to its reflector electrode. It is obvious, however, that any oscillator which can be frequency modulated in synchronism with external circuits may be used. The output of oscillator 11 is applied through an adjustable section of the transmission line such as line stretcher 12 to a standard cavity 13, the resonant frequency of which is known. Terminal 14 provides for the changing of standard cavities. The line stretcher 12 may be adjusted so that the maximum power is delivered to detector load 19 when the oscillator frequency is far off the resonant frequency of cavity 13. The power delivered to detector 19 is reduced to a minimum as the changing oscillator frequency passes through cavity resonance. The resulting signal is applied to the cathode ray indicator 21 through amplifier 20. The resonance curve for such a circuit condition is almost symmetrical. However, for other line lengths the shifting of phase results in the resonance curve becoming quite unsymmetrical, hence adjustment of the line stretcher 12 serves to change the shape of the signal pip appearing on the screen of indicator 21. It is apparent that a line stretcher as used herein is merely an embodiment of a phase shifting network and that the invention need not necessarily be limited to that particular embodiment.

Similarly, as the oscillator output frequency reaches the resonant frequency of the cavity to be tested, herein specified as test cavity 17, this test cavity causes a change of power delivered to load 19 which is similarly detected, amplified, and indicated. The line length coupling the test cavity 17 to the circuit is likewise made adjustable by line stretcher 16. Terminal 18 provides for readily switching the cavities to be tested. Decoupling network 15 is made adjustable to match the impedances of the line to the load and to the cavities and serves to reduce interaction between cavities 13 and 17.

Since the sawtooth that frequency modulates oscillator 11 also supplies the horizontal deflection for indicator 21, any difference in the resonant frequencies of cavities 13 and 17 will result in a horizontal displacement between the times of occurrence of the output power reductions.

If the test cavity is of an adjustable type, and it is desired to match the frequencies of the two cavities, the line stretchers are first adjusted until the pips appearing on the cathode ray tube are approximately symmetrical in shape. The test cavity is then adjusted until its pip moves horizontally so as to coincide with the pip from the standard cavity. The two cavities are then resonant at the same frequency.

It is obvious that a similar comparison can be made between the resonant frequencies of echo boxes, wavemeters, and other such microwave resonant devices.

The embodiment as portrayed in Fig. 2 consists of a circuit for checking the calibration of a wavemeter at three distinct points. The output of sawtooth generator 30 is applied to the horizontal deflection plates of cathode ray indicator 43, and to the reflector electrodes of reflex velocity-modulated oscillators 31, 32 and 33. The frequency modulated output of these oscillators is applied to cavities 34, 35 and 36 respectively, the resonant frequencies of these cavities being the three points at which it is desired to check the calibration of wavemeter 40. Each oscillator is mechanically tuned so that its maxium power output occurs at approximately the resonant frequency of the cavity in series with it. The power outputs from the cavities are adjusted to approximately the same level by variable attenuators 37, 38, 39 and are then coupled into a common transmission line, which feeds past wavemeter 40 to crystal detector 41. The detector output is applied to amplifier 42, the output of which provides vertical deflection pips on cathode ray indicator 43.

If wavemeter 40 is tuned to the resonant frequency of cavity #3, the screen presentation of its pip (as shown at f3 on indicator 43) will be distorted because of the reaction produced by the power absorbed by the wavemeter. If the wavemeter dial setting does not read the frequency at which cavity #3 is known to resonate, an error is apparent. By tuning the wavemeter until the pips at f2 and then at f1 are distorted, it is likewise possible to check the wavemeter calibration at the resonant frequencies of cavity #2 and cavity #1. Terminals may be provided for the changing of the reference cavities, and for the simple switching of the wavemeters to be calibrated.

Though the embodiment herein described discloses a circuit for checking the calibration of a wavemeter at three distinct points, it is obvious that the calibration of any tunable resonant circuit can be checked at any number of desired points without departing from the spirit of the invention.

It is believed that the construction and operation of my invention, as well as the advantages thereof, will be apparent from the foregoing description. It will be understood that while I have shown and described my invention in two particular embodiments, changes may be made in the circuits disclosed without departing from the invention, as sought to be defined in the following claims.

What is claimed is:

1. A frequency comparator for calibrating an unknown cavity resonator comprising, means for generating a sawtooth voltage, an oscillator which is frequency modulated by said sawtooth voltage, a reference cavity resonator, a decoupling network, a first and a second phasing network, said first phasing network connecting said reference cavity to the output of said oscillator, a detector connected through said decoupling network to the output of said oscillator, means for connecting said unknown cavity resonator through said second phasing network to the junction of said detector and said decoupling network, and a cathode ray indicator, means applying said sawtooth voltage as the sweep deflection voltage for said cathode ray beam, and means applying said detector output to said indicator as transverse or signal deflection.

2. A frequency comparator for calibrating an unknown cavity resonator comprising, means for generating a sawtooth voltage, an oscillator which is frequency modulated by said sawtooth voltage, a reference cavity resonator, a terminal adapted for connection of said reference cavity, a decoupling network, a first and a second phasing network, said first phasing network connecting said reference cavity terminal to the output of said oscillator, a detector connected through said decoupling network to the output of said oscillator, a terminal adapted for connection of said cavity to be calibrated, said terminal being connected through said second phasing network to the junction of said detector and said decoupling network, and a cathode ray indicator, means applying said sawtooth voltage to said cathode ray indicator as the sweep deflection thereof, and means applying said detector output to said cathode ray indicator as the transverse or signal deflection.

3. A frequency comparator for calibrating an unknown cavity resonator comprising, a means for generating a sawtooth voltage, a plurality of networks in parallel, each network including an oscillator which is frequency modulated by said sawtooth voltage, a standard cavity resonator, and a variable attenuator all serially connected, said parallel networks being coupled to a common transmission line, means for coupling said cavity resonator to be calibrated connected to said transmission line, a detector connected to said transmission line, and a cathode ray indicator, means applying said sawtooth voltage to said cathode ray indicator as the sweep deflection thereof, and means applying said detector output to said cathode ray indicator as the transverse or signal deflection.

4. A frequency comparator for microwave devices comprising, a source of microwaves, means for periodically varying the frequency of said source, a calibrated resonator, an uncalibrated resonator, a crystal detector load, a transmission line connecting said load and said resonators to said source, means to adjust the impedances of said line to obtain maximum power transfer to said load, and a cathode ray indicator responsive to said means for periodic variation of frequency and the power absorbed by said load to display the frequency response characteristics of said resonators.

5. A frequency comparator for microwave devices comprising a sawtooth voltage generator, a microwave oscillator which is frequency modulated by said sawtooth voltage, a reference cavity resonating at a known frequency, a second cavity, a crystal detector load, a transmission line connecting said load and said cavities to said oscillator, means to adjust the impedances of said line to obtain maximum power transfer to said load, and a cathode ray indicator, means applying the output of said sawtooth voltage source as a sweep deflection voltage for said indicator synchronized to said oscillator frequency modulation, and means applying the output of said detector to said indicator to provide transverse deflection, whereby the indicator displays the frequency response characteristics of said cavities.

6. A frequency comparator for microwave devices comprising, a sawtooth voltage source, a plurality of reference cavities, a plurality of microwave oscillators which are frequency modulated by said sawtooth voltage, each of said cavities being energized by one of said oscillators, each oscillator being tuned to maximum power output at the resonant frequency of its reference cavity, a variable cavity, a crystal detector load, means to couple said plurality of reference cavities to a common transmission line at a uniform power level, means to couple said load and said variable cavity to said common transmission line, a cathode ray indicator, means applying the output of said sawtooth voltage source as a sweep deflection voltage for said indicator synchronized to the frequency modulation of said oscillators, and means applying the output of said detector to said indicator to provide transverse deflection voltage, whereby said indicator displays the frequency response characteristics of said cavities.

7. A frequency comparator for calibrating resonant microwave components comprising, a microwave oscillator, a crystal detector, a transmission line coupling said detector to said oscillator, an indicator connected to said detector to display the microwave power delivered thereto, a calibrated cavity resonator coupled to said line, an uncalibrated cavity resonator coupled to said line, and means for periodically varying the frequency of said oscillator whereby said indicator displays the frequency at which said resonators absorb power from said oscillator.

8. A multifrequency comparator circuit for calibrating a resonant microwave component comprising, a plurality of microwave oscillators for generating a plurality of test frequencies, a plurality of calibrated cavity resonators each resonant at a separate frequency and energized by one of said oscillators, means for coupling said resonators to a common transmission line, an unknown resonator coupled to said line, a crystal detector coupled to said line, means for periodically varying the frequency of said oscillators, and means for indicating the variation of detector output with variation of frequency of said oscillators.

References Cited in the file of this patent

UNITED STATES PATENTS

| | | |
|---|---|---|
| 2,047,782 | Jensen | July 14, 1936 |
| 2,252,058 | Bond | Aug. 12, 1941 |
| 2,380,791 | Rosencrans | July 31, 1945 |
| 2,413,939 | Benware | Jan. 7, 1947 |
| 2,483,802 | Bradley | Oct. 4, 1949 |
| 2,498,548 | Howard | Feb. 21, 1950 |
| 2,580,968 | Sproull | Jan. 1, 1952 |